United States Patent
Malon (10) Patent No.: US 12,205,026 B2
(45) Date of Patent: Jan. 21, 2025

(54) ENHANCED WORD EMBEDDING

(71) Applicant: NEC Laboratories America, Inc., Princeton, NJ (US)

(72) Inventor: Christopher Malon, Fort Lee, NJ (US)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 17/674,461

(22) Filed: Feb. 17, 2022

(65) Prior Publication Data

US 2022/0277197 A1   Sep. 1, 2022

Related U.S. Application Data

(60) Provisional application No. 63/154,893, filed on Mar. 1, 2021.

(51) Int. Cl.
*G06N 3/08* (2023.01)
*G06F 40/166* (2020.01)
*G06F 40/242* (2020.01)
*G06F 40/279* (2020.01)

(52) U.S. Cl.
CPC ............ *G06N 3/08* (2013.01); *G06F 40/166* (2020.01); *G06F 40/242* (2020.01); *G06F 40/279* (2020.01)

(58) Field of Classification Search
None
See application file for complete search history.

(56) References Cited

U.S. PATENT DOCUMENTS

| | | | | |
|---|---|---|---|---|
| 11,461,668 | B1 * | 10/2022 | Mohandas | G06F 40/30 |
| 11,657,307 | B1 * | 5/2023 | Bodapati | G06N 20/00 |
| | | | | 706/15 |
| 2007/0136048 | A1 * | 6/2007 | Richardson-Bunbury | |
| | | | | G06F 16/3344 |
| | | | | 715/236 |
| 2022/0050967 | A1 * | 2/2022 | Veyseh | G06F 40/289 |

OTHER PUBLICATIONS

Liu, Yinhan, et al. "ROBERTa: A Robustly Optimized BERT Pretraining Approach", arXiv:1907.11692v1 [cs.CL]. Jul. 26, 2019, pp. 1-13.
Lauscher, Anne, et al. "Common Sense orWorld Knowledge? Investigating Adapter-Based Knowledge Injection into Pretrained Transformers", Proceedings of Deep Learning Inside Out (DeeLIO): The First Workshop on Knowledge Extraction and Integration for Deep Learning Architectures. Nov. 19, 2020, pp. 43-49.
Schick, Timo, et al. "BERTRAM: Improved Word Embeddings Have Big Impact on Contextualized Model Performance", Proceedings of the 58th Annual Meeting of the Association for Computational Linguistics. Jul. 2020, pp. 3996-4007.

(Continued)

*Primary Examiner* — Stella L. Woo
(74) *Attorney, Agent, or Firm* — Joseph Kolodka (57) ABSTRACT

Methods and systems for language processing include augmenting an original training dataset to produce an augmented dataset that includes a first example that includes a first scrambled replacement for a first word and a definition of the first word, and a second example that includes a second scrambled replacement for the first word and a definition of an alternative to the first word. A neural network classifier is trained using the augmented dataset.

18 Claims, 9 Drawing Sheets

(56) References Cited

OTHER PUBLICATIONS

Nie, Yixin, et al. "Adversarial NLI: A New Benchmark for Natural Language Understanding", Proceedings of the 58th Annual Meeting of the Association for Computational Linguistics. Jul. 2020, pp. 4885-4901.

Kim, Siwon, et al. "Interpretation of NLP models through input marginalization", Proceedings of the 2020 Conference on Empirical Methods in Natural Language Processing. Nov. 2020, pp. 3154-3167.

Zhu, Yukun, et al. "Aligning books and movies: Towards story-like visual explanations by watching movies and reading books", InProceedings of the IEEE international conference on computer vision. Dec. 7, 2015, pp. 19-27.

Devlin, Jacob, et al. "BERT: Pre-training of Deep Bidirectional Transformers for Language Understanding", arXiv:1810.04805v2 [cs.CL]. May 24, 2019, pp. 1-6.

Speer, Robyn, et al. "ConceptNet 5.5: An Open Multilingual Graph of General Knowledge", arXiv:1612.03975v2 [cs.CL]. Dec. 11, 2018, pp. 1-9.

Mikolov, Tomas, et al. "Efficient Estimation of Word Representations in Vector Space", arXiv:1301.3781v3 [cs.CL]. Sep. 7, 2013, pp. 1-12.

Kaneko, Masahiro, et al. "Dictionary-based Debiasing of Pre-trainedWord Embeddings", prearXiv:2101.09525v1 [cs.CL]. Jan. 23, 2021, pp. 1-12.

Kudo, Taku, et al. "SentencePiece: A simple and language independent subword tokenizer and detokenizer for Neural Text Processing", Proceedings of the 2018 Conference on Empirical Methods in Natural Language Processing (System Demonstrations), Brussels, Belgium. Oct. 31-Nov. 4, 2018, pp. 66-71.

De Smedt, Tom, et al. "Pattern for Python", Journal of Machine Learning Research 13. Jun. 2012, pp. 2063-2067.

Yang, Zhilin, et al. "XInet: Generalized autoregressive pretraining for language understanding", Advances in neural information processing systems, 33rd Conference on Neural Information Processing Systems (NeurIPS 2019). Jun. 19, 2019, pp. 1-11.

Singh, Push, et al. "Open mind common sense: Knowledge acquisition from the general public", InOTM Confederated International Conferences On the Move to Meaningful Internet Systems, Springer, Berlin, Heidelberg. Oct. 30, 2002, pp. 1223-1237.

Talmor, Alon, et al. "Leap-Of-Thought: Teaching Pre-Trained Models to Systematically Reason Over Implicit Knowledge", 34th Conference on Neural Information Processing Systems (NeurIPS 2020). Jun. 11, 2020, pp. 1-11.

Bowman, Samuel R., et al. "A large annotated corpus for learning natural language inference", Proceedings of the 2015 Conference on Empirical Methods in Natural Language Processing, Lisbon, Portugal. Sep. 2015, pp. 632-642.

Tissier, Julien, et al. "Dict2vec : LearningWord Embeddings using Lexical Dictionaries", Proceedings of the 2017 Conference on Empirical Methods in Natural Language Processing, Copenhagen, Denmark. Sep. 2017, pp. 254-263.

Chen, Qian, et al. "Neural Natural Language Inference Models Enhanced with External Knowledge", Proceedings of the 56th Annual Meeting of the Association for Computational Linguistics (Long Papers), Melbourne, Australia. Jul. 2018, pp. 2406-2417.

\* cited by examiner

ENHANCED WORD EMBEDDING

RELATED APPLICATION INFORMATION

This application claims priority to U.S. Provisional Patent Application No. 63/154,893, filed on Mar. 1, 2021, incorporated herein by reference in its entirety.

BACKGROUND

Technical Field

The present invention relates to natural language processing, and, more particularly, to text classification models.

Description of the Related Art

Word embeddings in natural language processing, for words that do not often occur in the corpus that they are calculated from, may have low statistical significance. Thus, neural models that rely on these embeddings may not perform well on rare words or technical vocabulary not used to train the embeddings. This may be a challenge for natural language inference models, sentiment classification models, and other text classification models, many of which rely on pre-trained word embeddings.

SUMMARY

A method for language processing includes augmenting an original training dataset to produce an augmented dataset that includes a first example that includes a first scrambled replacement for a first word and a definition of the first word, and a second example that includes a second scrambled replacement for the first word and a definition of an alternative to the first word. A neural network classifier is trained using the augmented dataset.

A system for language processing includes a hardware processor and memory. The memory stores a computer program, which, when executed by the hardware processor, causes the hardware processor to augment an original training dataset to produce an augmented dataset that includes a first example that includes a first scrambled replacement for a first word and a definition of the first word, and a second example that includes a second scrambled replacement for the first word and a definition of an alternative to the first word, and to train a neural network classifier using the augmented dataset.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A text classifier can be enhanced by augmenting a training dataset with examples that have definitions of the words attached. The enhanced classifier may classify examples in which a word is scrambled and a definition of the scrambled word is appended to the text. To construct the enhanced training dataset, a mixture of original training examples and enhanced training examples may be used. Words in an example are identified on the basis of a likelihood that they would change the classification of the example. These words may be scrambled and defined.

Scrambling the word forces the model to focus on the definition, rather than what it already has learned about the word. Including replacements for such words in the enhanced training set causes the model to use the definition, rather than contextual bias, to predict the classification.

Figure 1:
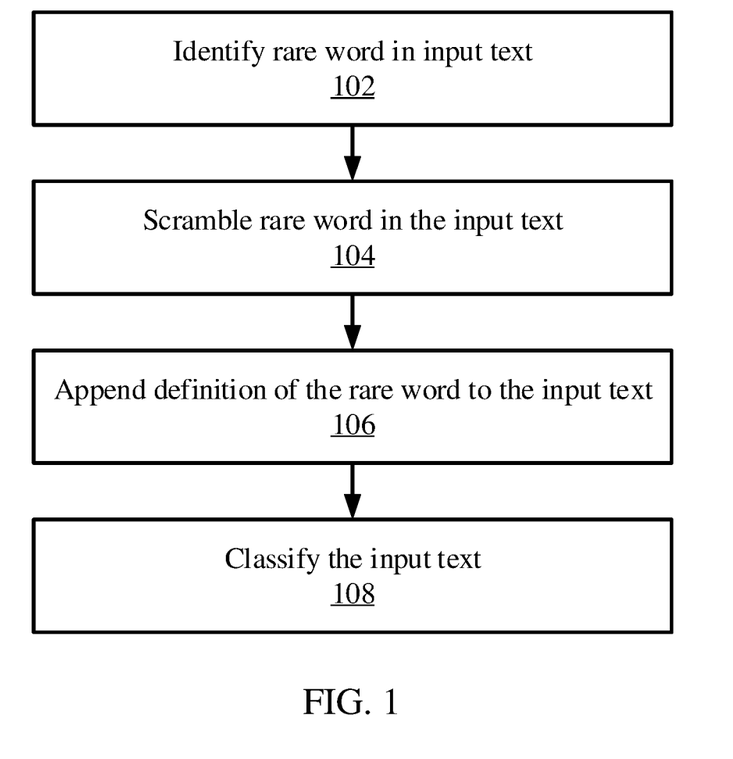
FIG. 1 is a block/flow diagram of a method for performing a natural language processing task using a classifier that is trained to consider word definitions, in accordance with an embodiment of the present invention.

Referring now in detail to the figures in which like numerals represent the same or similar elements and initially to FIG. 1, a method of using an enhanced classifier is shown. The enhanced classifier will be described in greater detail below, in particular with respect to the augmentation of the training data used to train the classifier. Block 102 receives an input text and identifies a rare word within the input text. The rare word may be identified by any appropriate process, such as by determining a frequency of occurrence of the word within a corpus and comparing the frequency to a threshold. Words having a below-threshold frequency may be considered to be rare, as their prevalence in the corpus may be too low to effectively train the classifier without augmentation.

Block 104 scrambles the rare word in the input text. This scrambling may replace the rare word with a string of random characters, for example between 4 and 12 characters long. Obfuscation of the word helps to prevent the classifier from using inaccurate embeddings that might apply to the word. For example, if the word has a common usage as well as a rarer technical usage, scrambling the word in the input text prevents the word's common usage from dominating the output of the classification.

Block 106 appends a definition for the rare word to the input text. This definition may be derived from any appropriate source. Block 108 uses the enhanced classifier to classify the modified input text, including the scrambled word and the appended definition. The presence of the definition helps the enhanced classifier to provide accurate results, despite the rare word.

Figure 2:
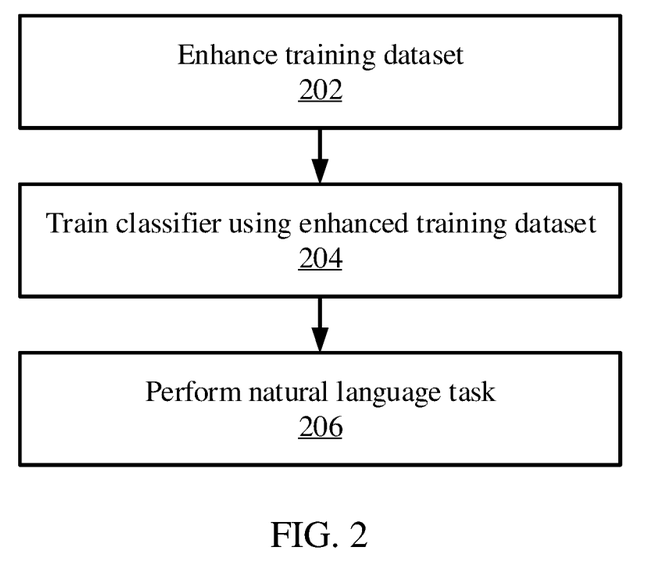
FIG. 2 is a block/flow diagram of a method for training and using a classifier using an augmented training dataset that includes word definitions, in accordance with an embodiment of the present invention.

Referring now to FIG. 2, a method of training an enhanced classifier using an augmented dataset is shown. Block 202 enhances the dataset, as will be described in greater detail below, adding examples to an original training dataset by appending definitions to certain words. Block 204 retrains an original classifier using the augmented training dataset, so that the enhanced classifier has the benefit of the definition information for rare words.

Block 206 performs a natural language task using the enhanced classifier. In one example, the task may include natural language inference. This task may determine whether a hypothesis statement is supported, contradicted, or neither, based on a premise statement. For example, based on the premise statement, "Jack is a doctor," and the hypothesis statement, "Jack heals the sick," then natural language inference may conclude that the hypothesis is implied by the premise.

While natural language inference can readily be performed on text that uses common language, more specialized or technical language may make such inferences more challenging. If, for example, the premise statement were, "Jack specializes in gastroenterology," a natural language inference classifier that was trained on general purpose corpuses may fail to capture the subject matter of Jack's specialization. In other cases, a word may have multiple different usages, which may result in poor classifier performance when dealing with the less common meaning. For example, if the example included the statement, "Jack set up the Christmas tree," the classifier might not have sufficient training to recognize a specialized use of the term, such as in the oil industry, where "Christmas tree" may refer to a set of valves at the top of an oil well.

Natural language inference can be used for such applications as fact verification, in which a claim is compared to retrieved facts from a trusted corpus, or analysis of customer reviews, where the decisions of a natural language inference classifier may be counted to quantify the prevalence of opinions or problems expressed by customers. Besides natural language inference, the invention may be applied to other text classifiers, such as for sentiment analysis or topic classification.

Figure 3:
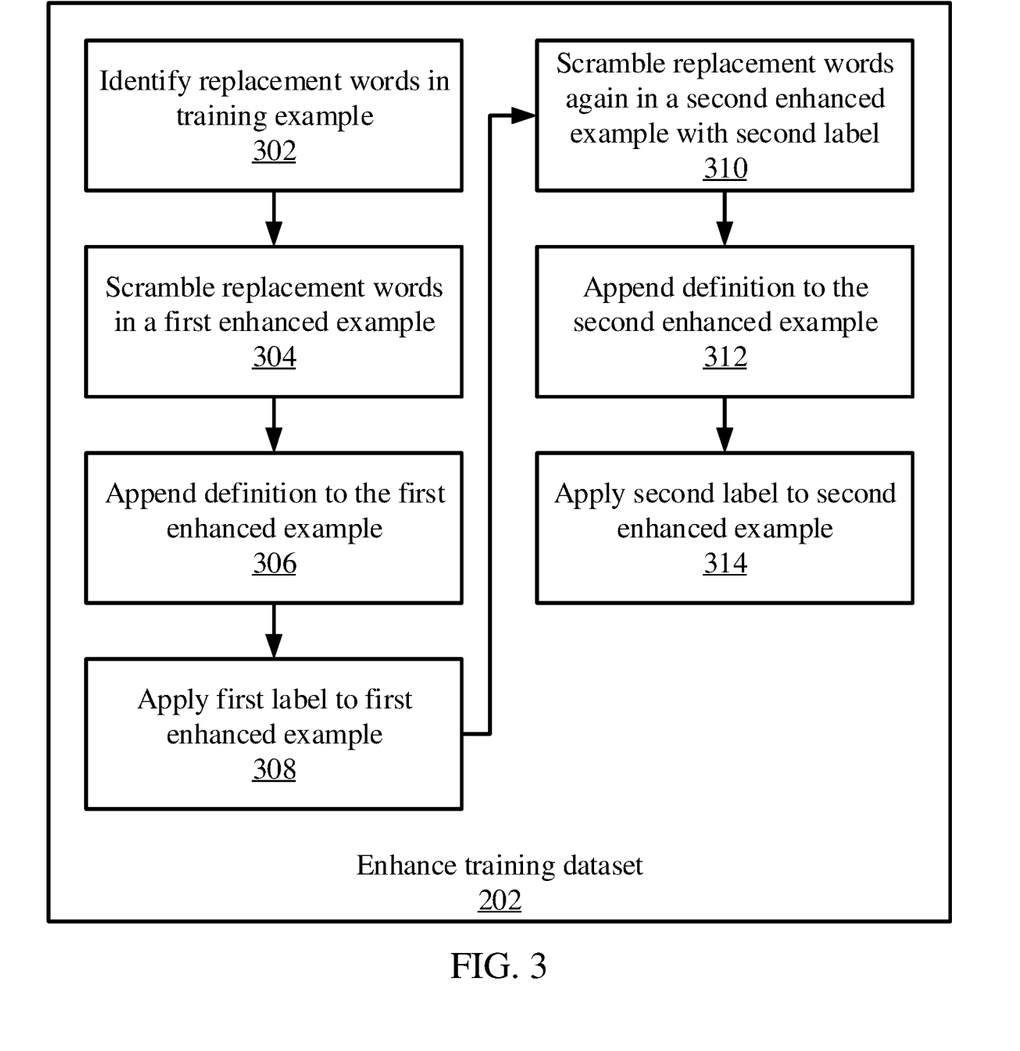
FIG. 3 is a block/flow diagram of a method for augmenting a training dataset to scramble certain words and to append word definitions to examples, in accordance with an embodiment of the present invention.

Referring now to FIG. 3, additional detail on enhancing the training dataset 202 is shown. For an example in the original training dataset, block 302 identifies words that may be replaced. Additional detail on this step will be provided below. The identified word(s) are selected according to the effect that their replacement will have on classification of the example by an original classifier, trained on the original training dataset.

During the identification of the replacement words, first and second labels are identified for the original training example. The first labels are determined by the original classifier, corresponding to the label identified by the classifier using the original example text. The second labels are determined by the original classifier as the label that would be determined if the word(s) were replaced.

Block 304 scrambles any identified replacement words in the original example to produce a first enhanced example. Scrambling may include removing the replacement words and replacing them with strings of random characters. For example, the scrambled words may be strings of 4-12 random characters. Block 306 appends definitions of the replacement words to the first enhanced example. Block 308 applies the first label to the first enhanced example, so that the first enhanced example has the same label as the original training text would have had.

The definitions may be drawn from any appropriate source dictionary. To define a word, its part of speech may be determined in the original context, and the word may be lemmatized. The corresponding definition for the identified part of speech of the word can then be drawn from the source dictionary. In one embodiment, the first numbered definition may be used. The definition may be rendered in the form, "<word> means: <definition>". This format ensures that the definitions and the word being defined can be easily recognized by the classifier.

Blocks 310-314 performs the same process to form a second enhanced example from the original training example. In this case, block 310 scrambles the replacement word(s) with another, different string of random characters to generate a second enhanced example. Block 312 appends the definition of the replacement word(s) to the second enhanced example. Block 314 then applies the second label to the second enhanced example. The second enhanced example therefore has the label that the original classifier would have been used if the replacement word had been replaced.

This process may be repeated for any or all of the training examples in the original training dataset. Some examples may not have any replacement words, and so will not generate any enhanced examples.

Figure 4:
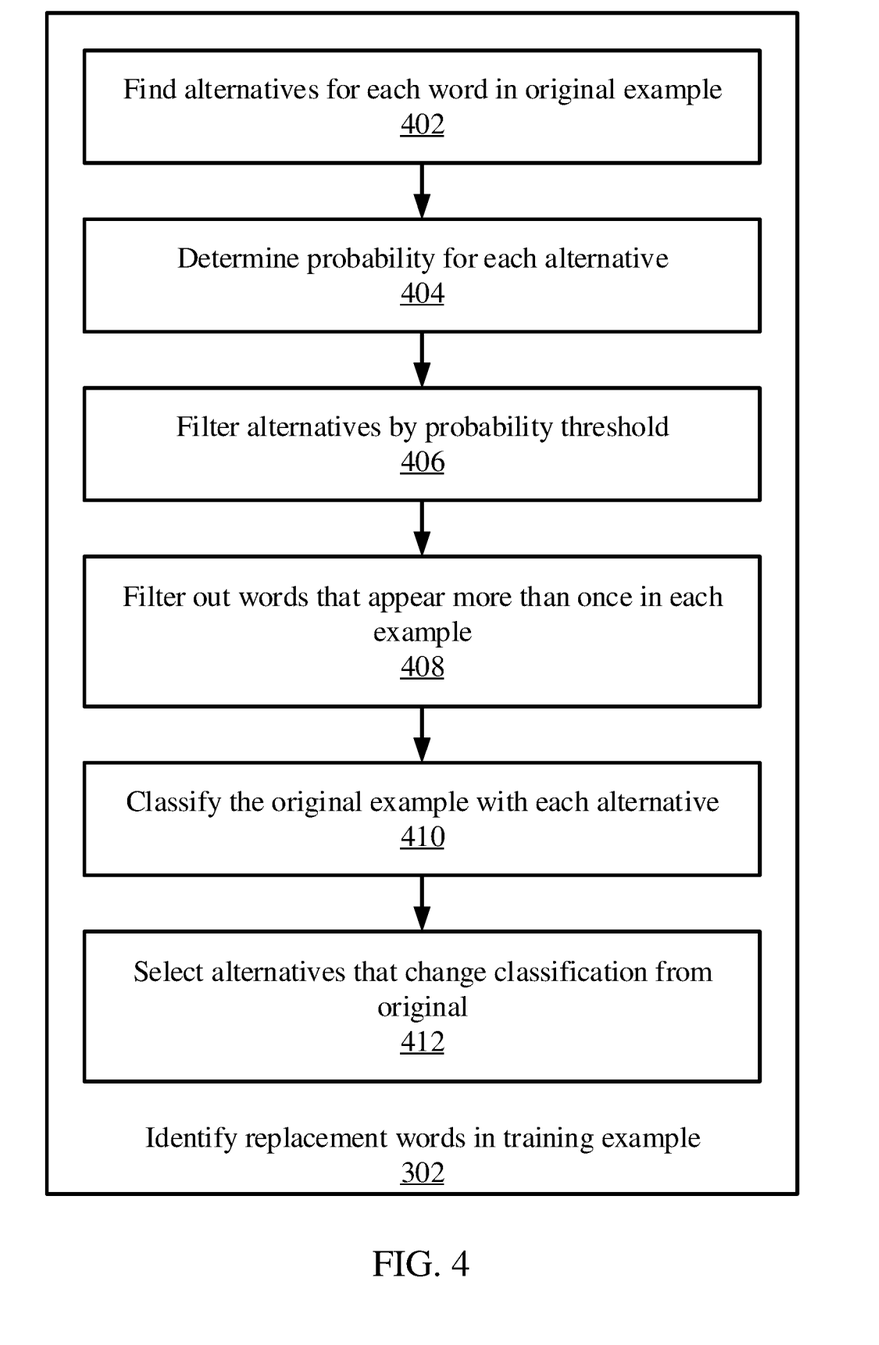
FIG. 4 is a block/flow diagram of a method for identifying words within an original training dataset to scramble, in accordance with an embodiment of the present invention.

Referring now to FIG. 4, additional detail on the identification of replacement words in the training example 302 is shown. Block 402 uses any appropriate language model to find alternatives for each word in the original training example. For each alternative, block 404 determines a respective probability.

Block 406 filters the alternatives according to a probability threshold. Thus, alternatives having a probability that is lower than the probability threshold are removed from consideration. Block 408 further filters out any words that appear in the original training example more than once. This may be because the meaning of repeated words tends to impact the classification less than the fact that they all match.

Block 410 classifies the original training example with each of the remaining alternatives. Thus, if there are three alternatives having above-threshold probabilities remaining after the filtering of blocks 406 and 408, block 410 will use the original classifier to classify the original training example three times, with each remaining alternative replacing its respective original word. Block 412 selects any alternative that changes the classification relative to the classification of the original training example. This selected alternative is output, and the respective original word from the original training example is identified as the replacement word.

The replacement word is selected to identify a place where the definition of the word matters to the classification of the entire example. Thus, given a sequence of tokens x, the term $x_{-i}$ represents the sequence without the $i^{th}$ token, $x_i$. The probability of predicting a class $y_c$ can be marginalized over possible alternative words $\tilde{x}_i$ in a vocabulary V as:

$$p(y_c \mid x_{-i}) = \sum_{\tilde{x}_i \in V} p(y_c \mid \tilde{x}_i, x_{-i}) p(\tilde{x}_i \mid x_{-i})$$

The term $p(y_c \mid x_{-i})$ may be compared to $p(y_c \mid x)$ to quantify the importance of $x_i$. The probabilities $p(\tilde{x}_i \mid x_{-i})$ may be computed by the language model.

The computation of $p(y_c \mid \tilde{x}_i, x_{-i})$ may be truncated to words such that $p(\tilde{x}_i \mid x_{-i})$ exceeds a threshold (e.g., about 0.05). The word $x_i$ may thus be marked as a replacement word if there exists an alternative $\tilde{x}_i$ such that:

$$\operatorname*{argmax}_y p(y \mid \tilde{x}_i, x_{-i}) \neq \operatorname*{argmax}_y p(y \mid x)$$

$$p(\tilde{x}_i \mid x_{-i}) > 0.05$$

In one embodiment, because the classification model may use sub-words as tokens, whereas whole words may be identified as alternatives, the sub-words of $x_i$ may be excluded when forming $x_{-i}$, but replacements are only considered if they are a single sub-word long.

Figure 5:
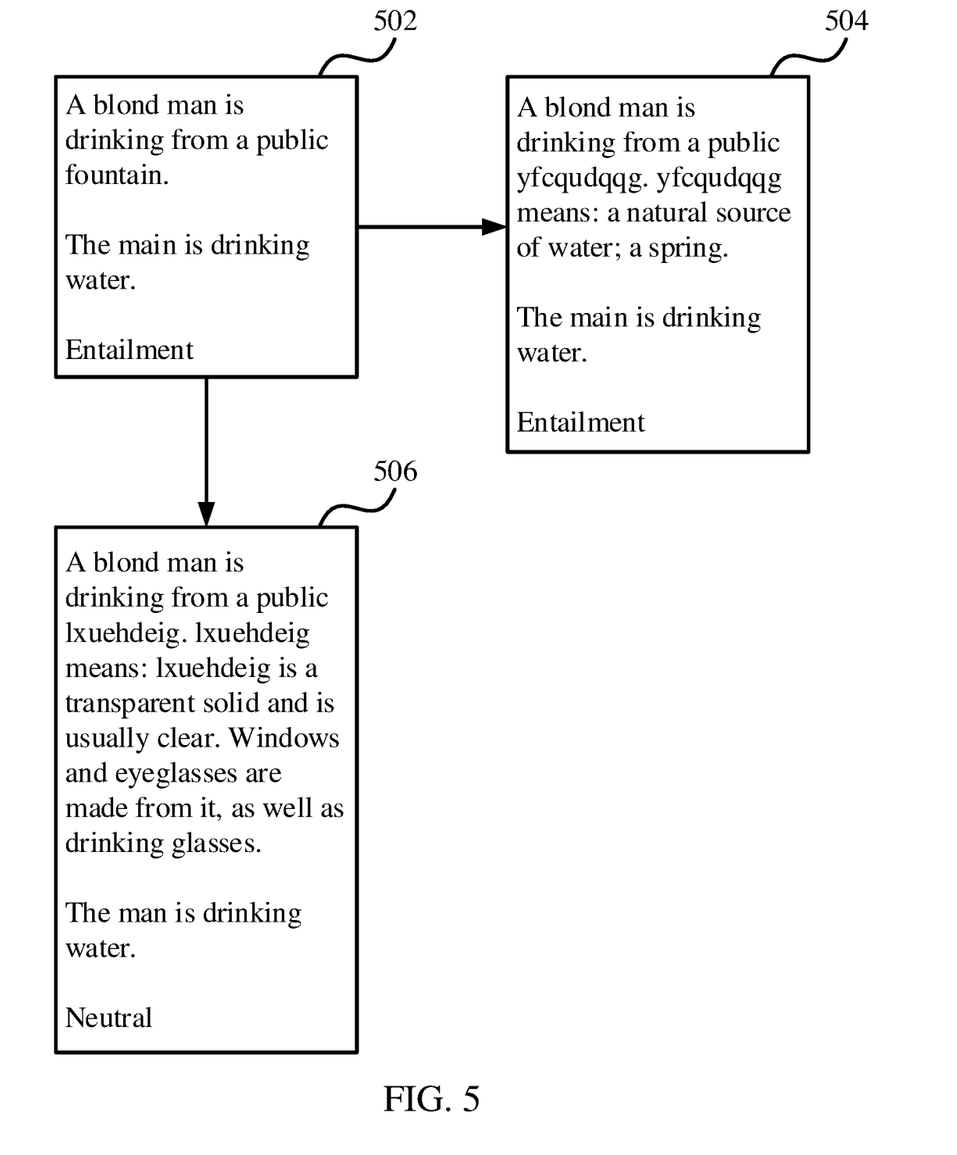
FIG. 5 is a diagram of the relationship between an original training example, a first augmented example that defines a word from the original training example, and a second augmented example that defines an alternate word, in accordance with an embodiment of the present invention.

Referring now to FIG. 5, an example is shown of augmented training examples. In this example, an original training example 502 is shown. The example includes a portion of text ("A blond man is drinking from a public fountain."), an interpretation of the text ("The man is drinking water."), and a label for the text ("Entailment").

From this original example 502, a first augmented example 504 and a second augmented example 506 are generated. A replacement word is identified ("fountain"), as it is recognized that changing the term "fountain" to the term "glass" would change the label of the text. In the first augmented example 504, the replacement word is scrambled with random characters ("yfcqudqqg"). A definition of the replacement word is appended to the text, in this case a definition for the term "fountain." In the second augmented example 506, the replacement word is scrambled with a different set of random characters ("lxuehdeig"). In this case, the definition of the alternative word ("glass") is appended to the text, and the label is changed to reflect the classification result for the text with the alternative word ("Neutral").

When training is performed, all three of these examples may be used as training data, including the original example 502, the first augmented example 504, and the second augmented example 506. In some cases, only a subset of the examples may be used for training.

Figure 6:
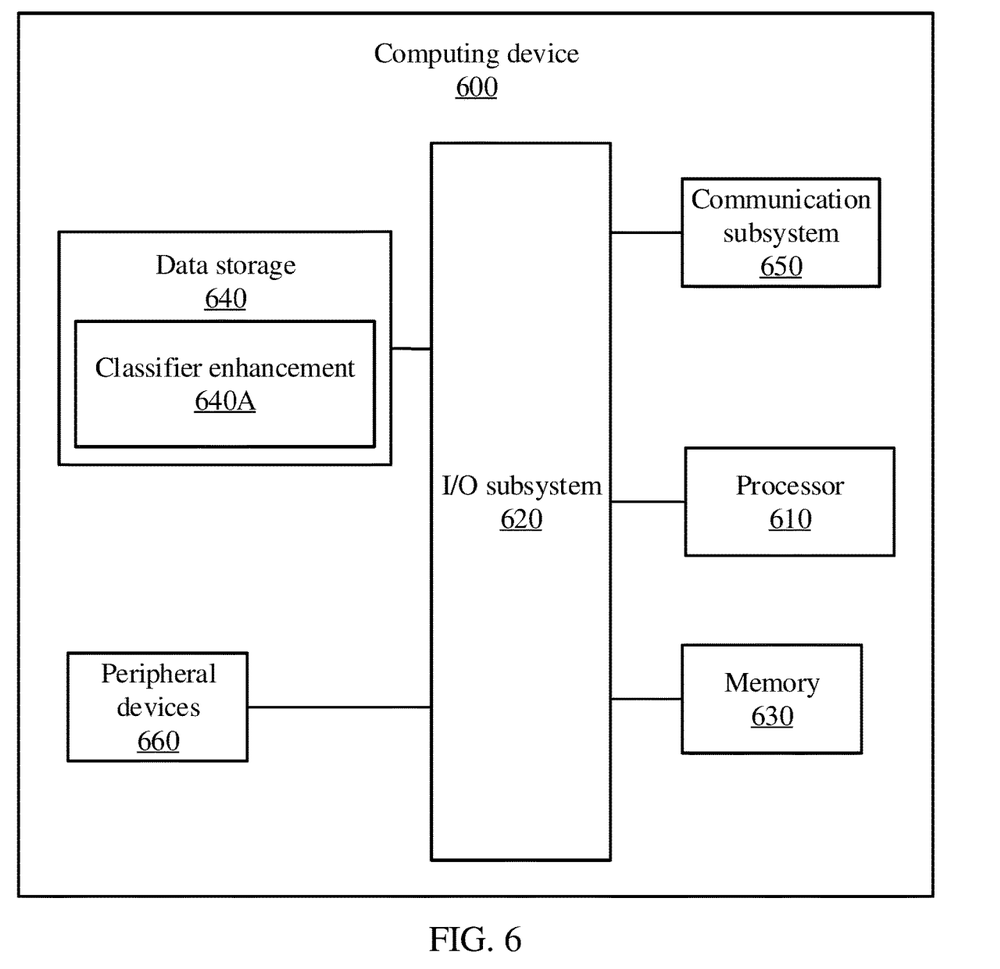
FIG. 6 is a block diagram of a system that can enhance classifier performance using an augmented training dataset, in accordance with an embodiment of the present invention.

Referring now to FIG. 6, an exemplary computing device 600 is shown, in accordance with an embodiment of the present invention. The computing device 600 is configured to perform classifier enhancement.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for classifier enhancement. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 7:
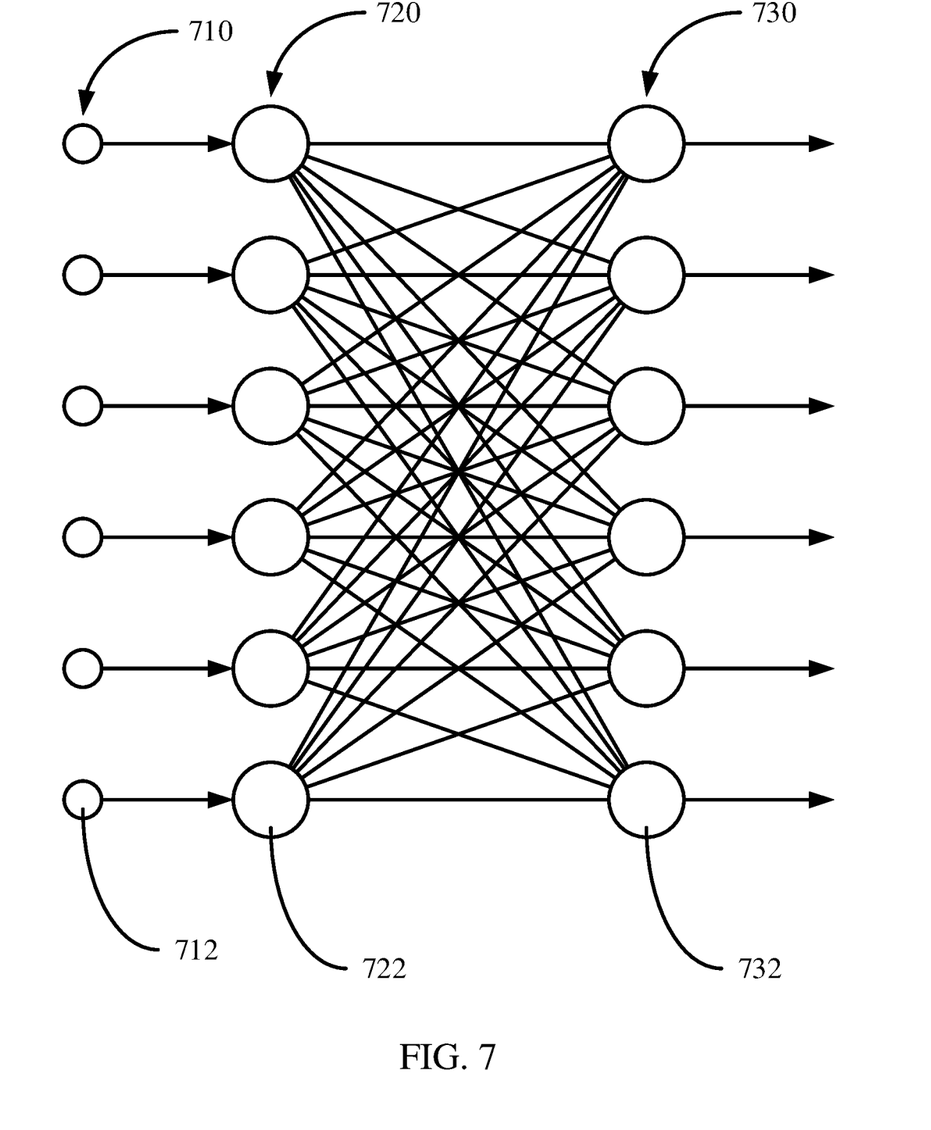
FIG. 7 is a diagram of an exemplary neural network architecture that may be used to implement a natural language model, in accordance with an embodiment of the present invention.
Figure 8:
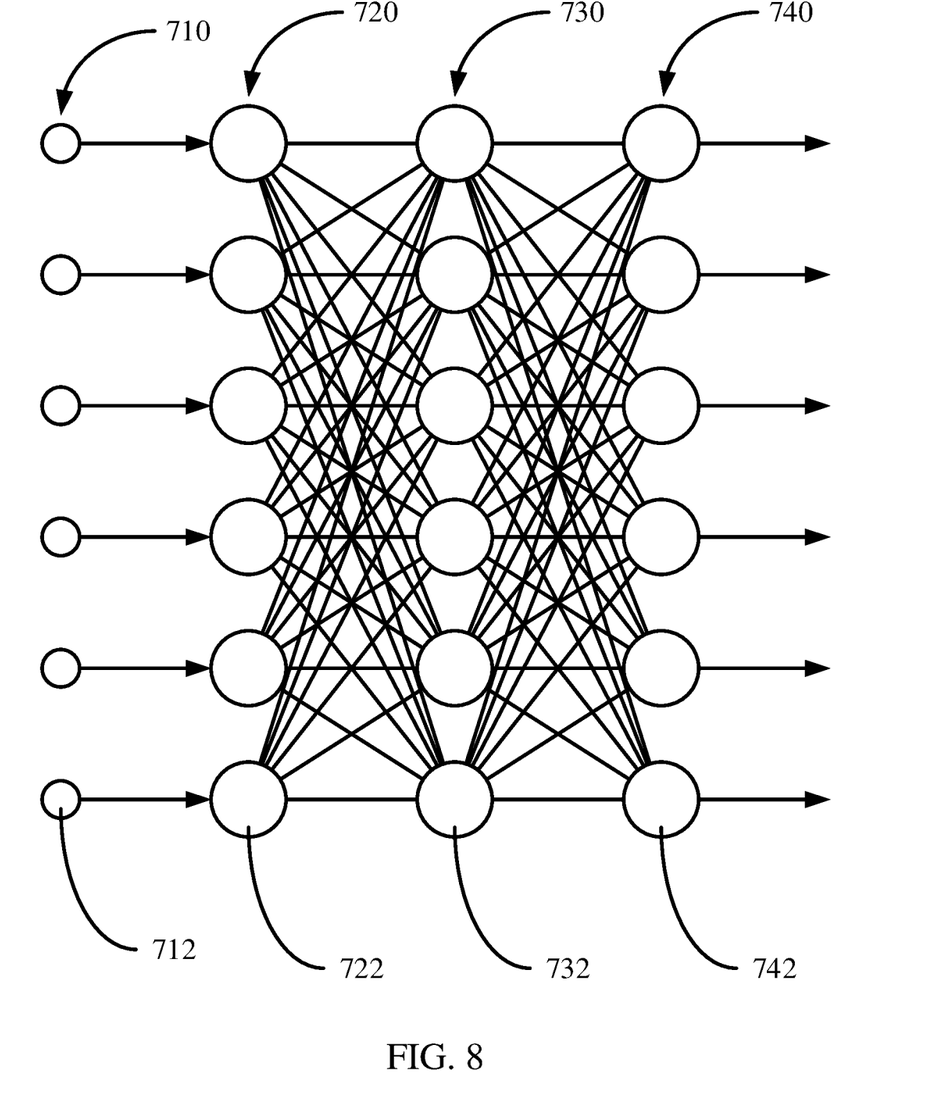
FIG. 8 is a diagram of an exemplary deep neural network architecture that may be used to implement a natural language model, in accordance with an embodiment of the present invention; and, FIG. 9 is a diagram showing an exemplary application of word embedding with a classifier trained using an augmented training dataset.

Referring now to FIGS. 7 and 8, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Figure 9:
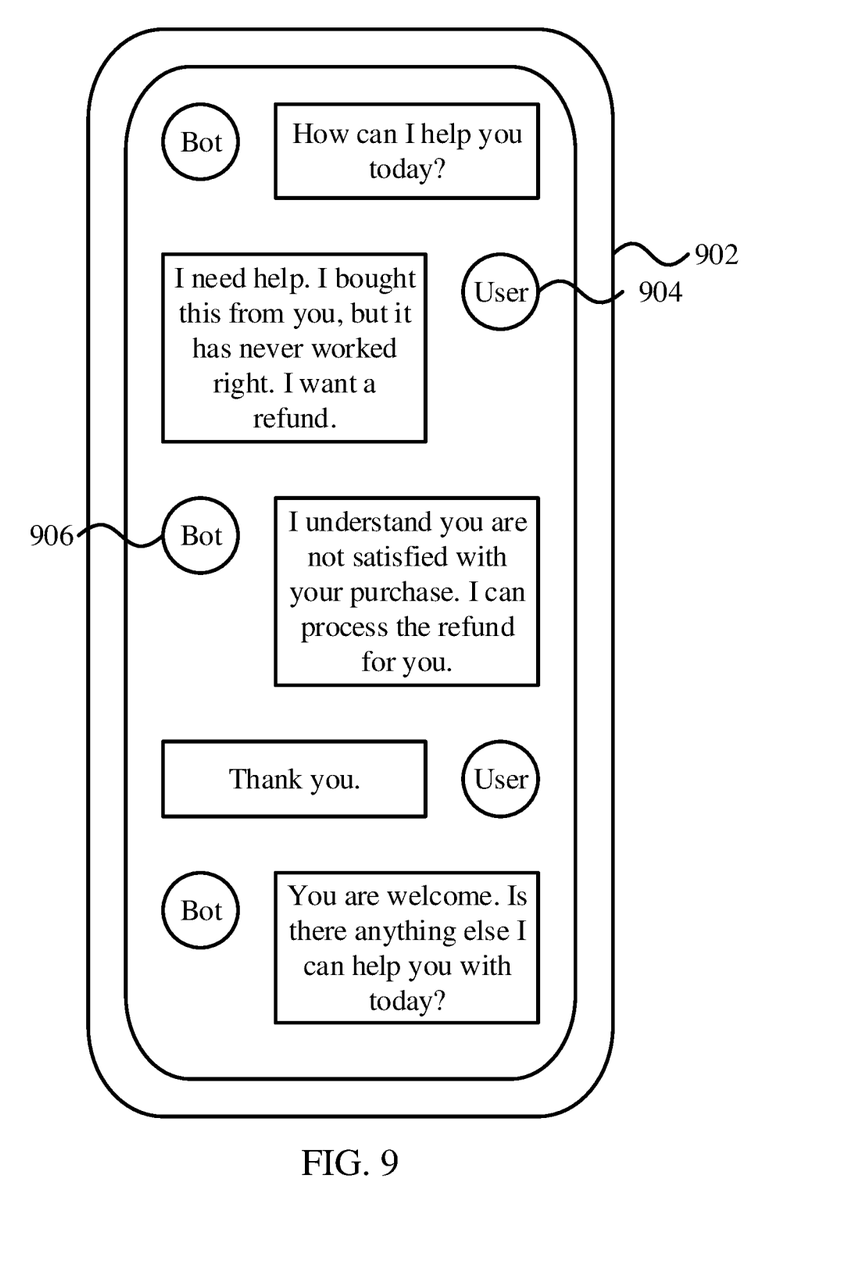

Referring now to FIG. 9, an exemplary application of text classification and natural language inference is shown. An automated chat interface 902 is shown, which allows a user 904 to input text and receive appropriate responses from an automated agent 906. The system identifies the semantic and emotional content of the input text and formulates a response.

For example, the system can identify the nature of a user's request, and further can identify how strongly the user feels about their situation. In this example, the user has negative feelings about a product and requests a resolution. Using a system that is trained as described above, an automated system can respond to user inputs that use rare or technical language.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for language processing, comprising:
augmenting an original training dataset to produce an augmented dataset that includes a first example that includes a first scrambled replacement for a first word and a definition of the first word, and a second example that includes a second scrambled replacement for the first word and a definition of an alternative to the first word, wherein the first example and an original example have a same label and the second example has a different label; and
training a neural network classifier using the augmented dataset.

2. The method of claim 1, wherein augmenting an original dataset includes replacing the original example with first example and the second example.

3. The method of claim 2, wherein augmenting the original dataset includes selecting the first word from the original example by determining that the alternative to the first word has an above-threshold probability.

4. The method of claim 3, wherein selecting the first word from the first example further includes determining that the first word only occurs once in the first example.

5. The method of claim 2, wherein the first scrambled word occupies a same place in the first example as the first word occupies in the original example.

6. The method of claim 1, wherein the labels of the second example are determined by a classifier that is trained using the original example, but not the first example or second example.

7. The method of claim 1, wherein the scrambled word is a string of random characters.

8. The method of claim 1, further comprising performing a natural language processing task on input text using the trained neural network classifier.

9. The method of claim 8, wherein the natural language processing task is selected from the group consisting of natural language inference, fact verification, opinion analysis, sentiment analysis, and topic classification.

10. A system for language processing, comprising:
a hardware processor; and
a memory that stores a computer program, which, when executed by the hardware processor, causes the hardware processor to:
augment an original training dataset to produce an augmented dataset that includes a first example that includes a first scrambled replacement for a first word and a definition of the first word, and a second example that includes a second scrambled replacement for the first word and a definition of an alternative to the first word, wherein the first example and an original example have a same label and the second example has a different label; and
train a neural network classifier using the augmented dataset.

11. The system of claim 10, wherein the computer program further causes the hardware processor to replace the original example with first example and the second example.

12. The system of claim 11, wherein the computer program further causes the hardware processor to select the first word from the original example by determining that the alternative to the first word has an above-threshold probability.

13. The system of claim 12, wherein the computer program further causes the hardware processor to determine that the first word only occurs once in the first example.

14. The system of claim 11, wherein the first scrambled word occupies a same place in the first example as the first word occupies in the original example.

15. The system of claim 10, wherein the labels of the second example are determined by a classifier that is trained using the original example, but not the first example or second example.

16. The system of claim 10, wherein the scrambled word is a string of random characters.

17. The system of claim 10, wherein the computer program further causes the hardware processor to perform a natural language processing task on input text using the trained neural network classifier.

18. The system of claim 17, wherein the natural language processing task is selected from the group consisting of natural language inference, fact verification, opinion analysis, sentiment analysis, and topic classification.

* * * * *